Nov. 20, 1962

P. L. RICHMAN

APPARATUS FOR REDUCING EFFECTS OF GRID CURRENT IN STABILIZED AMPLIFIERS

Filed Nov. 25, 1955

3,065,428

INVENTOR
PETER L. RICHMAN
BY
Burgess, Ryan & Hicks
ATTORNEYS

United States Patent Office 3,065,428
Patented Nov. 20, 1962

3,065,428

APPARATUS FOR REDUCING EFFECTS OF GRID CURRENT IN STABILIZED AMPLIFIERS

Peter L. Richman, New York, N.Y., assignor to Reeves Instrument Corporation, New York, N.Y., a corporation of New York Filed Nov. 25, 1955, Ser. No. 548,993
3 Claims. (Cl. 330—9)

This invention relates to improvements in electronic amplifiers and more specifically to apparatus for minimizing the effects of input grid current in electron tubes used in stabilized D.C. computing amplifiers on the magnitude of the input signal and thereby improve the accuracy of computation.

D.C. feedback amplifiers used for computing and other purposes generally have a frequency response that is substantially uniform from D.C. to possibly 10,000 cycles or even higher. In such amplifiers, drift or change in the characteristics of the amplifier, particularly at low frequencies, seriously limits their usefulness and for this reason A.C. stabilizing circuits are usually interposed in the input of the amplifier and within the feedback loop. Such circuits utilize one or more electron tubes, and provide substantially drift-free operation of the amplifier. It has been found, however, that the D.C. potential on the input grid of a stabilizing tube produced by the flow of even small currents within the tube is sufficient to substantially modify the magnitude of a signal being amplified. Since A.C. stabilization of itself provides low frequency response of the system up to a minimum of several cycles per second, the use of a high pass R-C filter in series with the input to the remaining portion of the system and within the feedback loop has been suggested but found to be undesirable for several reasons. For instance, synchronization of the amplifier, requiring among other things the discharge of this condenser, either becomes impossible or takes an extremely long time after energy is first applied to the amplifiers or after over-loading by an exceedingly large input signal. Actual tests have shown that the synchronizing time or time required for the discharge of the series condenser forming part of the R-C filter takes from several minutes to several hours if the amplifier will synchronize at all. In amplifiers not utilizing such an R-C filter, the synchronizing or stabilizing time is of the order of 10 to 25 seconds.

The present invention overcomes the foregoing difficulties encountered in stabilizing feedback amplifiers and provides an improved method and circuit for reducing the effect of grid current on the input signal being amplified in the computing portion of the system as well as eliminating the adverse effects of high-pass R-C filters on the time required for stabilizing the amplifier.

Another object of the invention resides in the provision of means cooperating with a high-pass filter connected with the input of a stabilized feedback amplifier and responsive to potentials stored on one or more condensers forming part of the high-pass filter to effect a relatively rapid discharge of such condensers.

The above and other objects and advantages of the invention will become more apparent from the following description and accompanying drawings forming part of this application.

Figure 1:
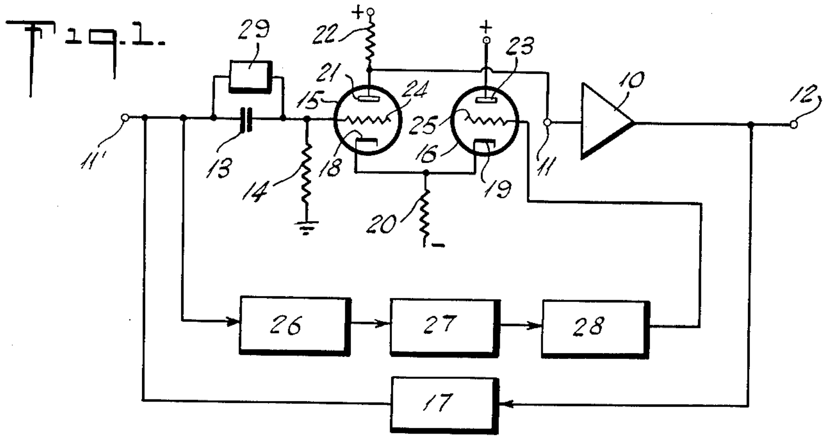
FIG. 1 is a block diagram of a D.C. feedback amplifier embodying stabilizing means in accordance with the invention.

Referring now to the drawings and more specifically to FIG. 1, a D.C. amplifier of conventional configuration is denoted by the numeral 10 and has an input terminal 11 and an output terminal 12. For convenience and clarity the ground terminals of the amplifier as well as certain other elements of the circuit have been omitted in accordance with standard practice. The input signal to be amplified is applied to the summing terminal 11' and fed through the R-C filter, including condenser 13 and resistor 14, to an input amplifier comprising in the illustrated form a triode tube 15 which is cathode coupled to a triode tube 16.

The feedback circuit includes a feedback network 17 which is connected from the output terminal 12 to the summing terminal 11'. This feedback network may comprise a condenser, resistor or combinations of impedances that may be required to attain a desired end.

The cathodes 18 and 19 of the tubes 15 and 16, respectively, are connected to a source of negative potential through a common biasing resistor 20. The plate 21 of the tube 15 is connected to the input of the D.C. amplifier 10 and to a source of positive potential through a plate load resistor 22. The plate 23 of the tube 16 is connected directly to a source of positive potential.

The input signal applied to the terminal 11' is fed to the grid 24 of the tube 15 through the condenser 13 and the grid is returned to ground through the resistance 14. In addition, the input signal is also applied to a balancing amplifier section which functions to balance out D.C. and very low frequency A.C. unbalanced signals.

The balancing amplifier section includes a modulator 26, a high gain A.C. amplifier 27 and a demodulator and filter 28. The input signal is fed through the modulator to the A.C. amplifier and then through the demodulator and filter to the grid 25 of the tube 16. The pass band of the demodulator and filter is generally limited to frequencies below three cycles per second so that signals having frequencies of that order impressed on the grid 24 of the tube 15 will also be impressed on the grid 25 of the tube 16 but in an opposite phase. Thus, for D.C. or very low-frequency A.C. signals, the gain of the balancing amplifier section will far exceed unity and therefore the signal appearing at the plate 21 of the tube 15 is due, at such frequencies, primarily to the output of the balancing amplifier section.

With the amplifier and balancing circuit thus far described, and assuming that the input signal to be amplified is applied through a suitable feed-through impedance directly to the grid 24 of tube 15, the grid current of tube 15 will produce a potential on the grid that will modify the input signal and seriously affect the accuracy of the computation. While this condition can be eliminated through the use of condenser 13 and the grid return resistor 14, the condenser 13 will during the starting period of the amplifier and during the presence of an excessively high input signal receive a charge that will not drain off or otherwise be removed within a reasonable time. This occurs by reason of the very high impedance at the input of the grid 24 of the input tube 15, in conjunction with the non-linear performance of the entire feedback system depicted in FIG. 1 under overload conditions. As a result, the condenser 13 and resistor 14 can not be generally used to overcome inaccuracies caused by grid current in the tube 15 or equivalent.

It has been found that the highly beneficial advantages of the R-C filter 14—13 can be retained and the disadvantages overcome through the employment of a non-linear impedance 29 bridging the condenser 13. With an impedance or resistance that decreases in value with an increase in current flowing therethrough, any voltage that would produce a charge on the condenser is rapidly bypassed and the condenser discharged. Since the impedance of the element 29 increases as the condenser 13 is discharged, element 29 will have minimum effect on the circuit under normal operating conditions. Devices meeting these requirements may be silicon carbide resistors, selenium diodes, silicon junction diodes, vacuum tubes or the like. Under certain conditions a relay also may be employed and this form will be discussed in connection with FIG. 3. In effect, therefore, the element 29 together wtih the resistor 14 forms a variable direct current attenuator so that in effect the condenser will not assume an appreciable charge in the presence of large D.C. potentials and any charge that may appear thereon is rapidly dissipated.

In the case of a silicon carbide resistor or so-called varistor, it would merely be connected in parallel with the condenser 13 as shown at 29 and the values of the varistor and resistor 14 would be chosen so that the former, under normal operating conditions, would preferably have an impedance or resistance of at least 10 or 20 times that of resistor 14.

Figure 2:
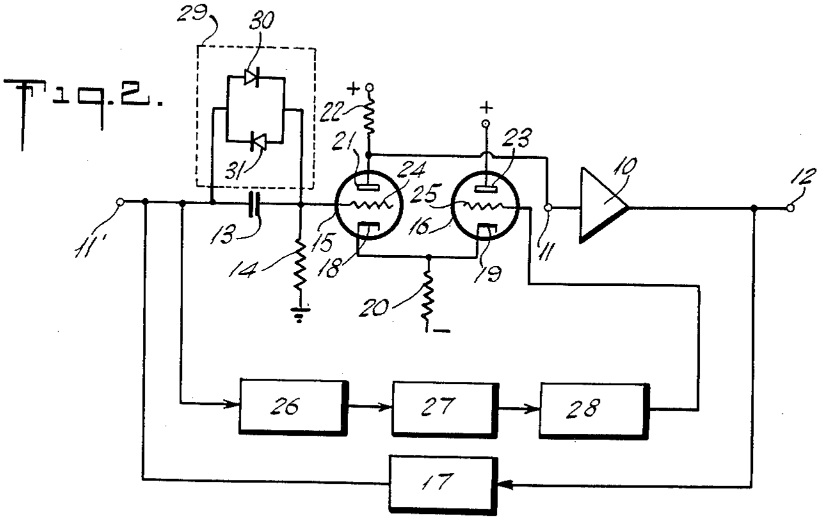
FIG. 2 is a block diagram of the amplifier shown in FIG. 1 but incorporating a modified embodiment of the invention.

The preferred embodiment of the invention is shown in FIG. 2 wherein the element 29 is in the form of a pair of diodes 30 and 31 connected back-to-back across the condenser 13. The other elements of the illustrated circuit are identical to those of FIG. 1 and like numerals have been used in both figures to denote like elements. An essential property of the diodes 30 and 31 to insure proper operation of the circuit is that their resistance at very low forward voltages—say 10 millivolts or less—be quite high, in the order of many megohms; while at forward voltages of one or two volts, the impedance must be appreciably lower than resistor 14. Typically, resistor 14 might be one megohm and condenser 13 one-tenth of a microfarad. Then a diode forward impedance at or below 10 millivolts of at least 50 megohms would insure a grid current reduction of better than 25 to 1 (the ratio of resistor 14 to the parallel impedances of the diodes). Meanwhile, since the impedance of the diodes for one or several volts of forward voltage is small compared with resistor 14, say less than 100K for the typical case where resistor 14 is one megohm, under overload conditions the D.C. amplifier output voltage is fed back to the grid with only 10% more attenuation than if the coupling network were not in the circuit. Thus when the amplifier is overloaded, immediately after the power is turned on and the amplifier output voltage is consequently large, the circuit functions essentially as it did before the addition of the input coupling network. Synchronization time, or time for the amplifier to come out of the overloaded condition, is not appreciably increased. On the other hand, the effective grid current existing in the input and feedback networks of the overall computing amplifier is greatly reduced in magnitude.

The circuit described has been tested with excellent results. Both selenium diodes and silicon carbide resistors have been used, with reductions in the effective grid current of from $6\times10^{-10}$ amperes to less than $0.5\times10^{-10}$ amperes in a typical case. Use of the circuit makes it possible consistently to obtain, without tube slection, effective grid currents of less than $10^{-10}$ amperes with average vacuum-tubes, a feat heretofore difficult if not impossible.

Figure 3:
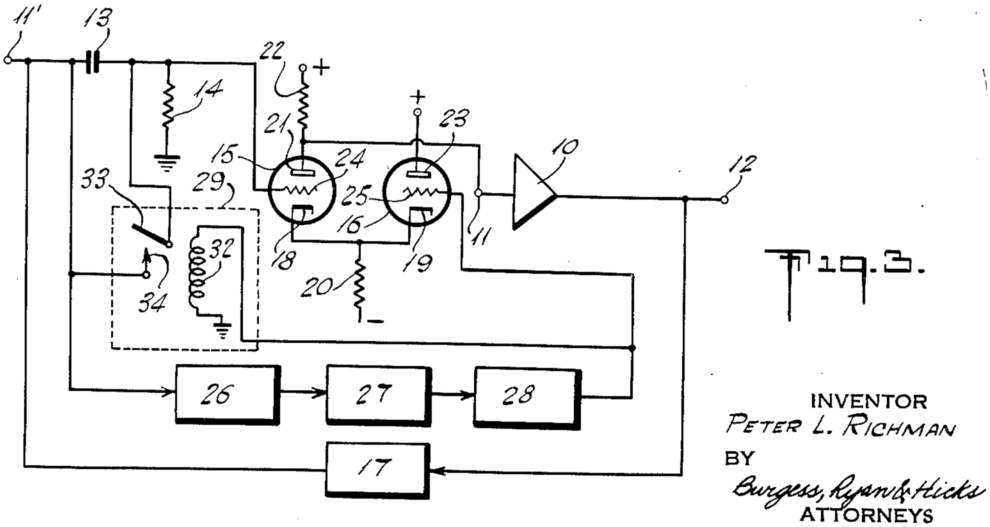
FIG. 3 is a block diagram of the amplifier of FIG. 1 embodying still another modification of the invention.

Still another embodiment of the invention useful in certain applications is shown in FIG. 3. This figure is substantially identical in certain respects to FIG. 1 and like numerals have therefore been used to identify like components in each of these figures. In this form of the invention the element 29 comprises a relay having a coil 32 and a pair of normally open contacts 33 and 34. The contact 33 is connected to one side of the condenser 13 while the contact 34 is connected to the other side of the condenser. The coil 32 of the relay has one side connected to the output of the demodulator-filter 28, while the other side is connected to ground. Under conditions wherein an excessively high or overload voltage is applied to the input of the amplifier of such a nature as to create a charge on the condenser 13, this voltage will be modulated, amplified and demodulated by elements 26 through 28 and produce an output voltage for application to the grid 25 of the tube 16. At the same time voltage will also be applied to the relay 32 that may be set to operate upon the presence of predetermined overload conditions. Operation of the relay 32 will close the contacts 33 and 34 providing a direct short across the condenser 13. This will immediately discharge the condenser 13 with the result that the voltage output from the demodulator and filter 28 will immediately be reduced and the relay contacts 33 and 34 will open to permit normal operation of the amplifier.

Each of the circuits described above provide in effect means for preventing the retention of any appreciable charge on the input condensers 13 used to isolate input signals from D.C. potentials at the input of the amplifier and thus permit rapid recovery of the amplifier after an overload or other similar condition that would have placed a substantial charge on the input condenser without shunting the condenser with an impedance, during normal operation, significantly small compared to the grid return resistor 14. In this way the time required to effect synchronization of an A.C. stabilized amplifier can be retained within the range of 20 to 25 seconds which is substantially the same required for synchronizing an amplifier without the use of a coupling condenser 13 and associated resistor 14.

While only certain modifications of the invention have been shown and described, it is apparent that other changes and alternations may be made without departing from the true scope and spirit thereof.

I claim:

1. A stabilized D.C. amplifier system comprising in combination, an input terminal, an output terminal, and a terminal common to said input and output terminals, a D.C. amplifier having first and second inputs and having an output circuit coupled between siad output terminal and said common terminal, an input condenser having a first terminal coupled to said input terminal and a second termnial coupled to the first input of said D.C. amplifier for preventing direct current flow from the first input of said D.C. amplifier to said input terminal, resistor means coupled between the first input of said D.C. amplifier and said common terminal, a high-gain balancing amplifier coupled between said input terminal and the second input of said D.C. amplier, feedback coupling means coupled between said output terminal and said input terminal, and first and second diodes each having a first terminal coupled to said input terminal and a second terminal coupled to the first input of said D.C. amplifier, said first and second diodes being oppositely polarized and directly coupled across said input condenser for providing a conductive discharge path for voltages developed across said input condenser.

2. The stabilized D.C. amplifier system as defined by claim 1 wherein said high-gain balancing amplifier comprises a modulator for converting an input voltage between said input and common terminals into an alternating voltage, an A.C. amplifier having its input coupled to said modulator, a demodulator coupled to the output of said A.C. amplifier, and low-pass filter means coupled to the output of said demodulator.

3. The stabilized D.C. amplifier system as defined by claim 1 wherein said D.C. amplifier includes first and second electron tubes each having a grid, cathode and plate, the grid of said first tube being said first input and the grid of said second tube being said second input, means including a plate load resistor for supplying a positive potential to the plate of the first tube, means for supplying a positive potential to the plate of the second tube, and a common resistor connecting both of the cathodes of said first and second tubes to a source of negative potential.

References Cited in the file of this patent

UNITED STATES PATENTS

| | | |
|---|---|---|
| 1,961,937 | McCutchen | June 5, 1934 |
| 1,975,371 | Place | Oct. 2, 1934 |
| 2,429,419 | McCoy | Oct. 21, 1947 |
| 2,613,344 | Nelson | Oct. 7, 1952 |
| 2,684,999 | Goldberg et al. | July 27, 1954 |
| 2,730,573 | Sedgfield et al. | Jan. 10, 1956 |
| 2,749,441 | Kelly | June 5, 1956 |
| 2,752,432 | Richter | June 26, 1956 |
| 2,845,490 | Knight | July 29, 1959 |

FOREIGN PATENTS

| | | |
|---|---|---|
| 23,162/35 | Australia | July 2, 1936 |

OTHER REFERENCES

Korn and Korn text, "Electronic Analog Computers," First Edition, 1952, pages 200–210 and 288–300.

Electronics Article, "Diode Limiters Simulate Mechanical Phenomena," by Morrill and Baum, Nov. 1, 1952, pages 122–126.